United States Patent
Chu

(10) Patent No.: US 11,228,532 B2
(45) Date of Patent: Jan. 18, 2022

(54) METHOD OF EXECUTING QOS POLICY AND NETWORK DEVICE

(71) Applicant: Hangzhou DPtech Technologies Co., Ltd., Zhejiang Province (CN)

(72) Inventor: Zetong Chu, Zhejiang (CN)

(73) Assignee: Hangzhou DPtech Technologies Co., Ltd., Zhejiang Province (CN)

( * ) Notice: Subject to any disclaimer, the term of this patent is extended or adjusted under 35 U.S.C. 154(b) by 48 days.

(21) Appl. No.: 16/727,094

(22) Filed: Dec. 26, 2019

(65) Prior Publication Data

US 2020/0274816 A1 Aug. 27, 2020

(30) Foreign Application Priority Data

Feb. 22, 2019 (CN) .......................... 201910133155.5

(51) Int. Cl.
*H04L 29/08* (2006.01)
*H04L 12/851* (2013.01)
*H04L 12/24* (2006.01)
*H04L 12/813* (2013.01)
*H04L 29/06* (2006.01)

(52) U.S. Cl.
CPC ...... *H04L 47/2483* (2013.01); *H04L 41/0893* (2013.01); *H04L 41/5003* (2013.01); *H04L 47/20* (2013.01); *H04L 69/22* (2013.01)

(58) Field of Classification Search
CPC ................................................. H04L 47/2483
See application file for complete search history.

(56) References Cited

U.S. PATENT DOCUMENTS 10,028,167 B2 * 7/2018 Calin ................. H04L 45/22
2014/0092740 A1 * 4/2014 Wang ................. H04L 47/12
370/235

* cited by examiner

*Primary Examiner* — Adnan M Mirza
(74) *Attorney, Agent, or Firm* — Greenblum & Bernstein, P.L.C.

(57) ABSTRACT

The present disclosure provides a method for executing a QoS policy and a network device, where the method includes: before a packet entering the network device goes through a preset forwarding process, it is determined whether the packet matches a flow template according to a property of the packet; if the packet matches the flow template, a session structure of a network session corresponding to the packet is acquired, a QoS dedicated structure is added to a tail of the session structure, a QoS policy corresponding to the flow template is acquired, the QoS policy is compiled to obtain policy information, and the policy information is filled to the QoS dedicated structure; and after the packet goes through the preset forwarding process, the policy information in the QoS dedicated structure is added to the packet, so that a switching chip of the network device executes the QoS policy.

8 Claims, 5 Drawing Sheets

METHOD OF EXECUTING QOS POLICY AND NETWORK DEVICE

CROSS-REFERENCE TO RELATED APPLICATIONS

The application claims priority to Chinese Patent Application No. 201910133155.5, filed on Feb. 22, 2019, the entire contents of which are hereby incorporated by reference for all purposes.

TECHNICAL FIELD

The present disclosure relates to the field of network communication technology, and in particular, to a method of executing a QoS policy and a network device.

BACKGROUND

With the rapid development of network technology, the data traffic carried on the network is getting increasingly larger, while the bandwidth resources are limited. This imposes higher requirements for network communication management. When the network is congested, it is important to ensure that important services are not delayed or discarded. In such application scenarios, QoS (Quality of Service) technology emerges. QoS refers to an ability of a network to provide better services for specified network communications using various basic technologies. QoS is a security mechanism of the network, which contains QoS policy functions and is a technique for resolving problems such as network latency and congestion.

SUMMARY

In view of this, the present disclosure provides a method of executing a QoS policy and a network device to effectively improve the execution efficiency of the QoS policy.

According to a first aspect of examples of the present disclosure, a method of executing a QoS policy is provided. The method is applied in a network device and includes: before a packet entering the network device goes through a preset forwarding process, determining whether the packet matches a flow template according to a property of the packet; if the packet matches the flow template, acquiring a session structure of a network session corresponding to the packet, adding a QoS dedicated structure to a tail of the session structure, acquiring a QoS policy corresponding to the flow template, compiling the QoS policy to obtain policy information, and filling the policy information to the QoS dedicated structure; and after the packet goes through the preset forwarding process, adding the policy information in the QoS dedicated structure to the packet, so that a switching chip of the network device executes the QoS policy.

According to a second aspect of examples of the present disclosure, a network device for executing a QoS policy is provided. The network device includes a switching chip, a processor coupled to the switching chip, and a machine-readable storage medium coupled to the processor and storing machine-executable instructions thereon. When the machine-executable instructions are executed by the processor, the processor is caused to perform the following operations including: before a packet entering to the network device goes through a preset forwarding process, determining whether the packet matches a flow template according to a property of the packet; if the packet matches the flow template, acquiring a session structure of a network session corresponding to the packet, adding a QoS dedicated structure to the tail of the session structure, acquiring a QoS policy corresponding to the flow template, compiling the QoS policy to obtain policy information, and filling the policy information to the QoS dedicated structure; and after the packet goes through the preset forwarding process, adding the policy information in the QoS dedicated structure to the packet, so that the switching chip executes the QoS policy.

DETAILED DESCRIPTION

Figure 1:
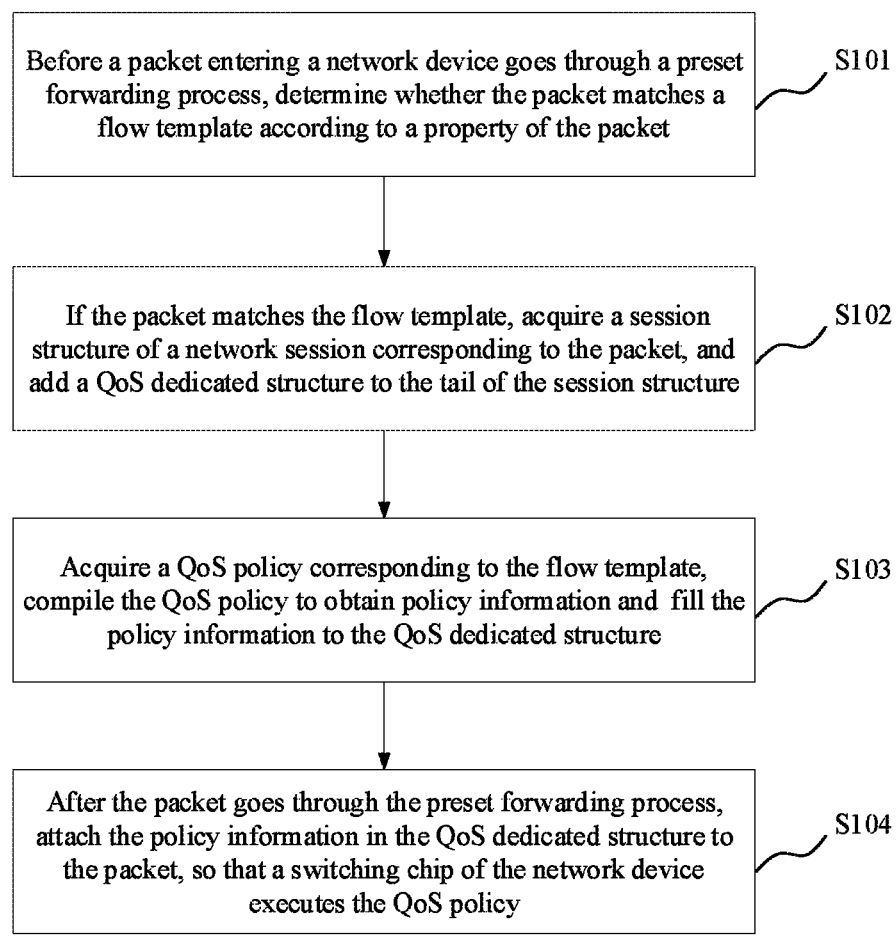
FIG. 1 is a flowchart of a method of executing a QoS policy shown in the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first", "second", "third" and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining".

In some examples, a QoS policy is implemented by a CPU (Central Processing Unit) of a network device (including a network device other than a switch, such as a firewall, etc.). The CPU performs functions such as scheduling or rate limiting of packets in each queue according to the actions of the policy.

However, in the above examples, both of the QoS policy matching-enqueuing and policy executing-dequeuing are implemented by the CPU, which requires higher CPU performance. When the traffic is heavy, the CPU load may reach a threshold, which will result in unknown problems, reduce the forwarding performance of network devices and reduce the efficiency of policy implementation. In addition, when the QoS policy is enabled, the impact on the CPU load is huge. The CPU is required to process each packet, especially the process of enqueuing and dequeuing the packets, which may affect the stability of various services.

Based on this, to effectively improve the execution efficiency of the QoS policy, the present disclosure provides a method of executing a QoS policy. Referring to FIG. 1, which is a flowchart of a method of executing a QoS policy shown in the present disclosure. This method can be applied in a network device, such as a firewall and other type of network device (other than a switch). As an example, in some scenarios, the method may be specifically executed by a processor of a network device, such as a CPU, which supports a basic QoS policy.

Moreover, the network device includes a switching chip. As an example, referring to FIG. 2, which is a schematic diagram of a CPU and a switching chip in a network device shown in the present disclosure. The switching chip supports basic QoS functions, such as queue-based basic rate limiting, scheduling, and bandwidth guarantee. The QoS functions of the switching chip (may also be referred to as chip QoS) are implemented when packets are enqueued at an inbound interface, and packets are dequeued at an outbound interface. Although the chip QoS cannot implement flexible flow template customization and policy customization as software QoS, but the chip QoS has a high performance and a relatively small error. In view of this, in the present disclosure, QoS policy is compiled through software into information that can be identified by the switching chip, and then both of the enqueue/dequeue operations are completed at the outbound interface of the switching chip.

As shown in FIG. 1, the method may include the following steps S101-S104.

At step S101, before a packet entering the network device goes through a preset forwarding process, it is determined whether the packet matches a flow template according to a property of the packet.

The preset forwarding process is not limited in the present disclosure. Those skilled in the art can choose and design according to different needs and different scenarios. These choices and designs that can be used herein do not depart from the spirit and protection scope of the present disclosure. As an example, in some scenarios, the preset forwarding process may be a fast forwarding process, and in this embodiment, the fast forwarding process should be disabled first, and thus the packet goes through a slow forwarding process, so that the CPU determines whether the packet matches a flow template according to a property of the packet. In other words, in this embodiment, after the packet enters the network device, the switching chip does not need to perform any operations, but first sends the packet to the CPU for processing and makes the packet go through the slow forwarding process. In the fast forwarding process, the CPU does not perform a flow template matching operation. In the slow forwarding process, the CPU performs a flow matching operation.

The flow template is the basis of the packet matching. After a packet enters the network device, the packet is enqueued and classified based on the flow template. The specific content of the flow template is not limited in the present disclosure. Those skilled in the art can choose and design according to different needs and different scenarios. These choices and designs that can be used herein do not depart from the spirit and protection scope of the present disclosure.

As an example, before determining whether the packet matches the flow template according to the property of the packet, the method may further include: configuring the flow template in advance. The flow template may be QoS flow template.

Figures 2, 3:
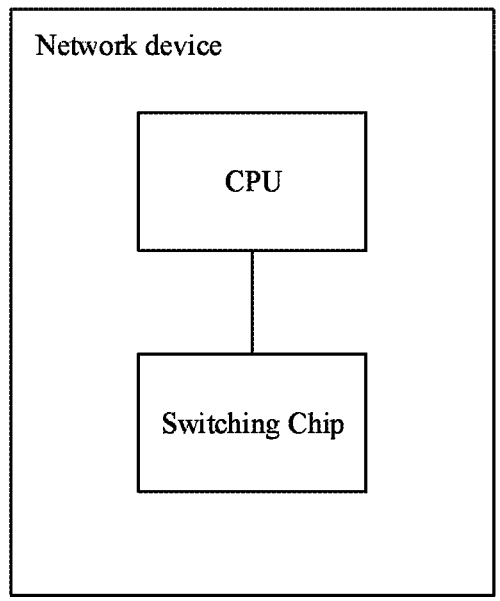
FIG. 2 is a schematic diagram of a CPU and a switching chip in a network device shown in the present disclosure.
FIG. 3 is a schematic diagram of a flow template shown in the present disclosure.

FIG. 3 is a schematic diagram of a flow template shown in the present disclosure. A flow template can be configured based on a protocol name, a source port number range, and a destination port number range. That is, whether a packet matches the flow template can be determined based on the protocol name, the source port number, and the destination port number of the packet. Specifically, when the protocol name of the packet is the same as the protocol name configured in the flow template, the source port number of the packet is within the source port number range configured in the flow template, and the destination port number of the packet is within the destination port number range configured in the flow template, it is determined that the packet matches the flow template.

As an example, before determining whether the packet matches the flow template according to the property of the packet, the method may further include: configuring a QoS policy in advance, and delivering a policy action to the switching chip. The policy action is associated with the QoS policy. And the policy action, for example, may indicate that the switching chip first output the packet mapping to the designated queue.

In addition to configuring the flow template, it is possible to configure the QoS policy in advance, and then deliver the policy action to the switching chip. The QoS policy is configured based on a physical port. The switching chip only knows the port on which the QoS policy is executed and the content of the QoS policy. Since the switching chip does not support performing the flow template matching, the switching chip does not know how to enqueue the packet. After the policy action associated with the QoS policy is delivered, the fast forwarding process is disabled, so that the packet goes through the slow forwarding process to determine whether the packet matches with the flow template.

At step S102, if the packet matches the flow template, a session structure of a network session corresponding to the packet is acquired, and a QoS dedicated structure is added to the tail of the session structure.

A session represents a session process between server and user. This process can be continuous or intermittent. For example, when a browser on the client is opened to send a first request to the server, the server will automatically create a session for the browser, assign a session ID (identifier) to the session, and send session ID to the browser. Later, when the client continues to request other resources in the browser, the client will receive the session ID, and according to the session ID, the client will find the previously created session objects in a memory, and provide the session objects to the request. The communication process is the network session.

Each network session has a dedicated session structure. The session structure corresponding to a network session can be searched out and a QoS dedicated structure is added to the tail of the session structure.

It is understood that for a plurality of packets with the same property in a session, it is not necessarily to add the QoS dedicated structure to the tail of corresponding session structure after receiving each packet, and the QoS dedicated structure may be added only one time. After a packet with the same property is received next time, if a QoS dedicated structure has been added to the tail of the previous session structure, there is no need to add the QoS dedicated structure repeatedly.

In addition, in some cases, the network session corresponding to the packet has not been established, so before determining whether the packet matches the flow template according to the properly of the packet, the method may further include: detecting whether a network session based on the packet has been established and if the network session has been established, allowing subsequent steps to be performed.

After receiving the packet, the CPU detects whether the network session based on the packet has been established. If it has been established, the CPU determines whether the packet property matches the flow template. When the packet property matches the flow template, it considers that the packet hits the flow template. If the session has not been established, no operation is performed or processing is performed according to other policies.

At step S103, a QoS policy corresponding to the flow template is acquired, the QoS policy is compiled to obtain policy information, and the policy information is filled to the QoS dedicated structure.

The configuration of the QoS policy is flexible and can be customized. For example, the QoS policy can be configured based on elements such as a time period, a five-tuple, and a traffic type. After that, when the property of the packet matches the flow template, the packet is classified and enqueued according to the QoS policy.

As an example in the present disclosure, the policy information of the QoS policy may include: mapping the packet to a designated queue and performing scheduling based on the designated queue. The policy information of the QoS policy includes the information of the designated queue which the packet is to be mapped.

Compiling the QoS policy to obtain the policy information, and filling the policy information to the QoS dedicated structure may include:

acquiring information of the designated queue from the QoS policy, and setting information of a mapping queue field in the QoS dedicated structure according to the information of the designated queue. The information of the mapping queue field includes a value of the mapping queue field.

At step S104, after the packet goes through the preset forwarding process, the policy information in the QoS dedicated structure is added to the packet, so that the switching chip of the network device executes the QoS policy.

At this step, the packet goes through the fast forwarding process, and the CPU queries to acquire the session structure of the packet. The QoS dedicated structure may be found in the session structure.

Then the mapping queue field in the QoS dedicated structure is acquired, information of the mapping queue field is filled in a hash header of the packet. For example, if information of the mapping queue field indicates that the packet is to be mapped to Queue 3, 3 is filled in the hash header of the packet.

That is, in some examples of the present disclosure, adding the policy information in the QoS dedicated structure to the packet may include:

acquiring the information of the mapping queue field in the QoS dedicated structure, and filling the information of the mapping queue field into a hash header of the packet.

At the outbound interface of the switching chip, the switching chip enqueues the packet according to the information of the mapping queue field in the hash header of the packet, strips the hash header, and executes the policy action that was delivered to complete the entire QoS policy.

In other words, as an example, executing, by the switching chip of the network device, the QoS policy may specifically include:

stripping, by the switching chip of the network device, the hash header at the outbound interface, and executing, by the switching chip of the network device, the policy action corresponding to the QoS policy according to the content of the hash header.

Figure 4:
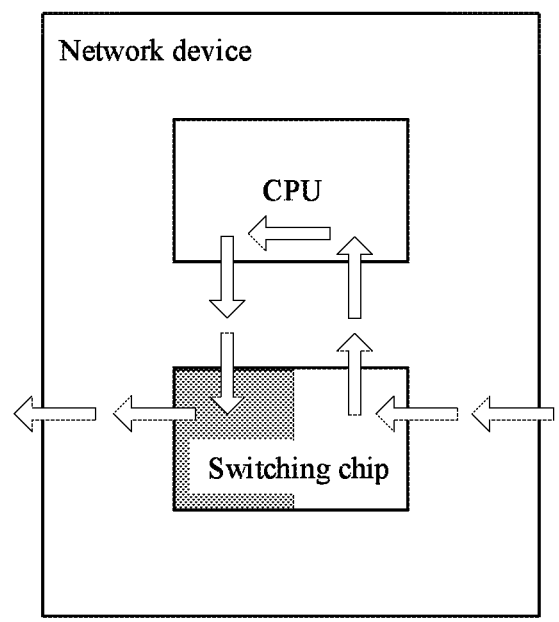
FIG. 4 is a schematic diagram of a data flow shown in the present disclosure.

A schematic diagram of a data flow in the entire process is shown in FIG. 4. In FIG. 4, after the packet enters the network device, the switching chip does not process the packet first, but first sends the packet to the CPU, so that the packet goes through the slow forwarding process. The CPU is responsible for performing more complex software QoS processing such as flow template matching. The software QoS processing is flexible and can perform flow templates matching based on the property of the packet, however, the switching chip cannot execute complex processing such as identifying BT download traffic, identifying video traffic, identifying office traffic, which needs to match the flow template. So if the packet enters the switching chip, the switching chip cannot directly execute the QoS policy based on the packet property. After the CPU finishes processing, the packet returns to the switching chip, and both of the enqueue/dequeue operations are performed at the same time at the outbound interface of the switching chip.

In the solution of this embodiment, before the packet goes through the preset forwarding process, the processor (CPU) of the network device performs flow template matching on the packet according to the property of the packet; acquires a session structure of the network session corresponding to the packet after the matching is completed; then, adds a QoS dedicated structure to the tail of the session structure; acquires the QoS policy corresponding to the flow template; compiles the QoS policy to obtain policy information; and fills the policy information to the QoS dedicated structure. In this way, when the packet goes through the preset forwarding process, the processor of the network device can add the policy information in the QoS dedicated structure to the packet, so that the switching chip of the network device can directly execute the QoS policy. In this solution, the flow template matching operation, the QoS policy compiling operation and policy actions executing operation are processed separately. The processor performs the flow template matching operation and the QoS policy compiling operation, and the switching chip performs the policy actions executing operation. Therefore, it not only can take advantages of the processor being capable of executing more complex software codes, implementing flexible flow template customization and policy customization, but also can overcome the disadvantages of its high consumption operation and low performance in enqueuing and dequeuing executed by the CPU. Further, it not only can take advantages of the high execution efficiency of the switching chip, but also can overcome the disadvantage of its poor flexibility. Thus, by combining the advantages of the processor and the switching chip, it can improve the performance while guaranteeing the flexibility of the QoS policy, and can effectively improve the execution efficiency of the QoS policy. Moreover, the processor is only responsible for identifying packet property but not performing specific policy actions, and does not involve high consumption operations of enqueuing and dequeuing the packet, which can effectively alleviate the pressure on the processor of the network device.

The following further describes the solution of the present disclosure in combination with specific application scenarios. Of course, the following application scenario is taken as an example, and in actual application, it can also be applied to other application scenarios.

Figure 5:
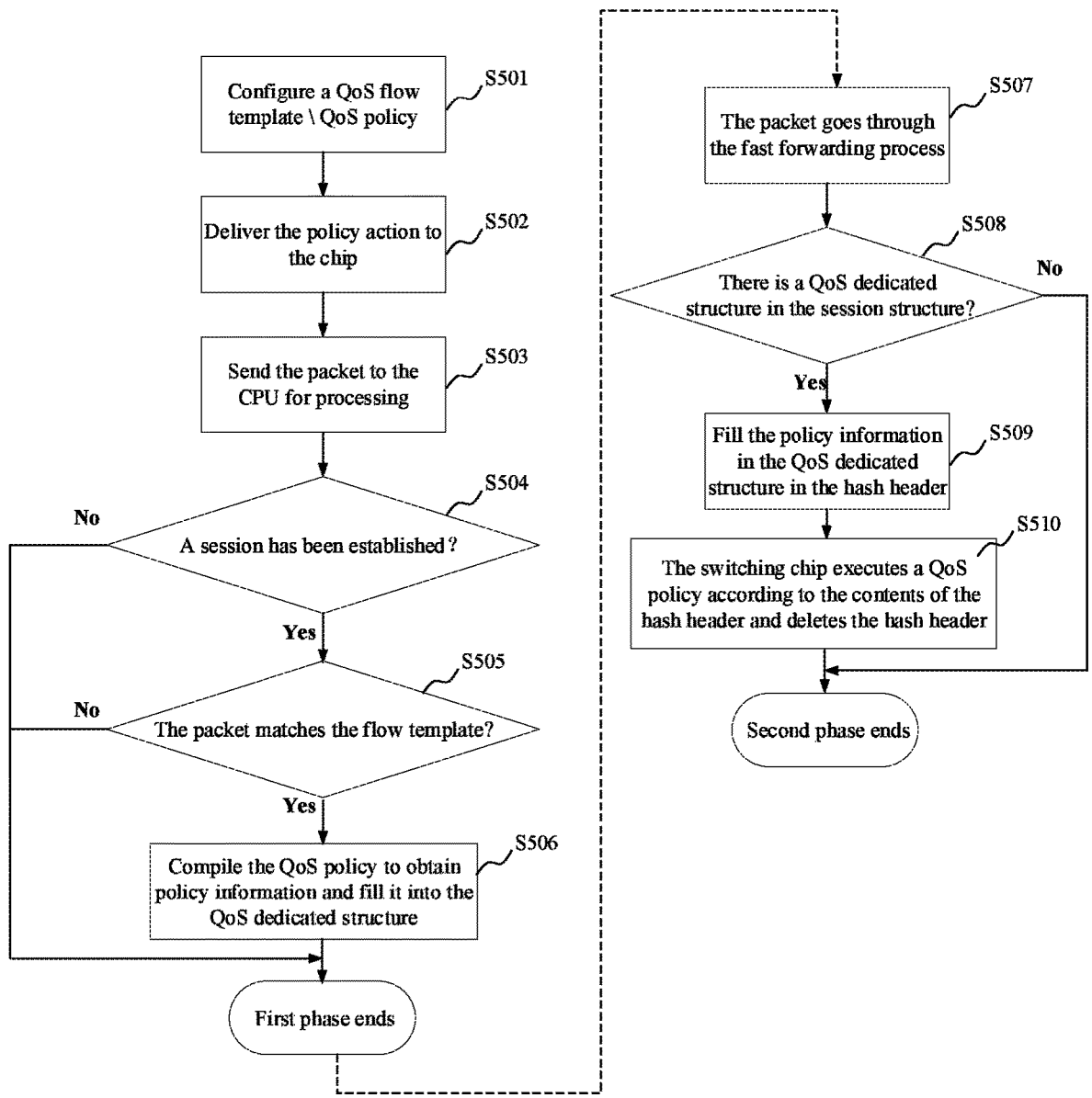
FIG. 5 is a flowchart of how to execute a QoS policy shown in in the present disclosure.

Referring to FIG. 5, which is a flowchart of how to execute a QoS policy shown in the present disclosure, the process of executing the QoS policy can be divided into two phases.

At step S501, a QoS flow template\a QoS policy are configured. The flow template is the basis of the packet matching. After a packet enters the network device, the packet is queued and classified based on the flow template.

At step S502, the policy action associated to the QoS policy is delivered to the switching chip. The policy action corresponds to the QoS policy. The QoS policy is configured based on a physical port. At this time, the switching chip only knows the port on which the QoS policy is executed and the content of the QoS policy. Since the switching chip does not support performing the flow template matching, the switching chip does not know how to enqueue the packet. After the policy action associated with the QoS policy is delivered, the fast forwarding process is disabled, so that the packet goes through the slow forwarding process, and to determine whether the packet matches with the flow template.

At step S503, the packet is sent to the CPU for processing. After the packet enters the network device, the switching chip does not need to perform any operation. The network device sends the packet to the CPU and the packet goes through the slow forwarding process.

At step S504, it is queried whether a session structure of a network session corresponding to the packet has been established. After receiving the packet, the CPU detects whether the network session based on the packet has been established. If the session has been established, then proceeds to step S505. If the session has not been established, no operation is performed and the first phase ends.

At step S505, it is determined whether the flow template is matched. The CPU determines whether the packet property matches the flow template. When the packet property matches the flow template, the CPU considers that the packet hits the flow template and proceeds to step S506, otherwise the first phase ends.

At step S506, the QoS policy action is compiled to obtain policy information, and the policy information is filled into the QoS dedicated structure added to the tail of the session structure. The QoS policy is configured based on the flow template, so the QoS policy corresponding to this flow template can be found and compiled according to the content of the QoS policy. For example, if the QoS policy is to map the packet to a queue and scheduled based on the queue, information of the mapping queue field in the QoS dedicated structure is set. The information of the mapping queue field includes a value of the mapping queue field.

At step S507, the packet goes through the fast forwarding process. And the session structure of the packet is queried to be acquired.

At step S508, it is determined whether there is a QoS dedicated structure in the session structure. If there is a QoS dedicated structure, it proceeds to step S509, otherwise the second phase ends.

At step S509, the policy information in the QoS dedicated structure is filled in the hash header of the packet. The mapping queue field in the QoS dedicated structure is acquired, and information of the mapping queue field is filled in the hash header of the packet (for example, if the packet is to be mapped to Queue 3, 3 is filled in the hash header of the packet).

At step S510, the switching chip executes a QoS policy according to the contents of the hash header and deletes the hash header. At the outbound interface of the switching chip, the switching chip enqueues the packet according to the information of the mapping queue field in the hash header of the packet, strips the hash header, and executes the policy action which was delivered at step S502 to complete the entire QoS policy.

In the solution of this embodiment, before the packet goes through the preset forwarding process, the processor (CPU) of the network device performs flow template matching on the packet according to the property of the packet; acquires a session structure of the network session corresponding to the packet after the matching is completed; then, adds a QoS dedicated structure to the tail of the session structure; acquires the QoS policy corresponding to the flow template; compiles the QoS policy to obtain policy information; and fills the policy information to the QoS dedicated structure. In this way, when the packet goes through the preset forwarding process, the processor of the network device can add the policy information in the QoS dedicated structure to the packet, so that the switching chip of the network device can directly execute the QoS policy. In this solution, the flow template matching operation, the QoS policy compiling operation and policy actions executing operation are processed separately. The processor performs the flow template matching operation and the QoS policy compiling operation, and the switching chip performs the policy actions executing operation. Therefore, it not only can take advantages of the processor being capable of executing more complex software codes, implementing flexible flow template customization and policy customization, but also can overcome the disadvantages of its high consumption operation and low performance in enqueuing and dequeuing executed by the CPU. Further, it not only can take advantages of the high execution efficiency of the switching chip, but also can overcome the disadvantage of its poor flexibility. Thus, by combining the advantages of the processor and the switching chip, it can improve the performance while guaranteeing the flexibility of the QoS policy, and can effectively improve the execution efficiency of the QoS policy. Moreover, the processor is only responsible for identifying packet property but not performing specific policy actions, and does not involve high consumption operations of enqueuing and dequeuing the packet, which can effectively alleviate the pressure on the processor of the network device.

The following are apparatus embodiment of the present disclosure and can be used to implement the method embodiment of the present disclosure. For details not disclosed in the apparatus embodiment of the present disclosure, reference can be made to the method embodiment of the present disclosure.

Figure 6:
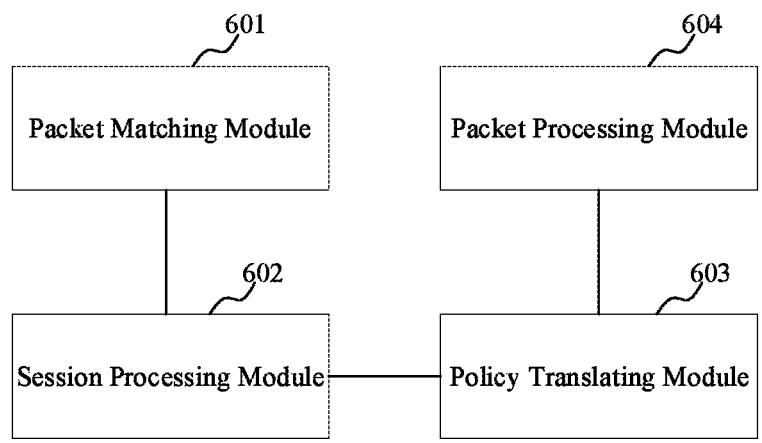
FIG. 6 is a schematic diagram of an apparatus for executing a QoS policy shown in the present disclosure.

Referring to FIG. 6, which is a schematic diagram of an apparatus for executing a QoS policy shown in the present disclosure. The apparatus can be applied in the network device, such as a firewall and other type of network device (other than a switch). The apparatus may include a packet matching module 601, a session processing module 602 and a policy compiling module 603 and a packet processing module 604.

The packet matching module 601 is configured to, before a packet entering the network device goes through a preset forwarding process, determine whether the packet matches a flow template according to a property of the packet.

As an example, in some scenarios, the preset forwarding process may be a fast forwarding process, and in this embodiment, the fast forwarding process is disabled first, so that the packet goes through the slow forwarding process to determine whether the packet matches the flow template. In other words, in this embodiment, after the packet enters the network device, the switching chip does not need to perform any operations, but first sends the packet to the CPU, and makes the packet go through the slow forwarding process.

The session processing module 602 is configured to, if the packet matches the flow template, acquire a session structure of a network session corresponding to the packet, and add a QoS dedicated structure to the tail of the session structure.

Each network session has a dedicated session structure. The session structure corresponding to a network session can be searched out and a QoS dedicated structure is added to the tail of session structure.

The policy compiling module 603 is configured to acquire a QoS policy corresponding to the flow template, compile the QoS policy to obtain policy information, and fill the policy information to the QoS dedicated structure.

The configuration of the QoS policy is flexible and can be customized. For example, the QoS policy can be configured based on elements such as a time period, a five-tuple, and a traffic type. After that, when the property of the packet matches the QoS policy, the packet is classified and enqueued.

The packet processing module 604 is configured to, after the packet goes through the preset forwarding process, add the policy information in the QoS dedicated structure to the packet, so that the switching chip of the network device executes the QoS policy.

At the outbound interface of the switching chip, the switching chip enqueues the packet according to the information of the mapping queue field in the hash header of the packet, strips the hash header, and executes the policy action that was delivered to complete the entire QoS policy.

As an example in the present disclosure, the policy information of the QoS policy includes: mapping the packet to a designated queue and performing scheduling based on the designated queue.

The policy compiling module 603 is further configured to: acquire information of the designated queue from the QoS policy, and set information of a mapping queue field in the QoS dedicated structure according to the information of the designated queue. The information of the mapping queue field includes a value of the mapping queue field.

The packet processing module 604 is further configured to: acquire information of a mapping queue field in the QoS dedicated structure, and fill the information of the mapping queue field into a hash header of the packet.

As an example in the present disclosure, executing, by the switching chip of the network device, the QoS policy includes:

stripping, by the switching chip of the network device, the hash header at the outbound interface, and executing, by the switching chip of the network device, the policy action corresponding to the QoS policy according to the content of the hash header.

As an example in the present disclosure, the apparatus may further include:

a session-presence determining module configured to, before the packet matching module determines whether the packet matches a flow template according to the property of the packet, detect whether a network session based on the packet has been established; and if the network session has been established, allow to trigger the packet matching module 601.

As an example in the present disclosure, the apparatus may further include:

a first pre-processing module configured to configure the QoS flow template in advance before it is determined whether the packet matches a flow template according to the property of the packet.

As an example in the present disclosure, the apparatus may further include:

a second pre-processing module configured to configure a QoS policy in advance, and deliver a policy action corresponding to the QoS policy to the switching chip.

In the solution of this embodiment, before the packet goes through the preset forwarding process, the processor (CPU) of the network device performs flow template matching on the packet according to the property of the packet; acquires a session structure of the network session corresponding to the packet after the matching is completed; then, adds a QoS dedicated structure to the tail of the session structure; acquires the QoS policy corresponding to the flow template; compiles the QoS policy to obtain policy information; and fills the policy information to the QoS dedicated structure. In this way, when the packet goes through the preset forwarding process, the processor of the network device can add the policy information in the QoS dedicated structure to the packet, so that the switching chip of the network device can directly execute the QoS policy. In this solution, the flow template matching operation, the QoS policy compiling operation and policy actions executing operation are processed separately. The processor performs the flow template matching operation and the QoS policy compiling operation, and the switching chip performs the policy actions executing operation. Therefore, it not only can take advantages of the processor being capable of executing more complex software codes, implementing flexible flow template customization and policy customization, but also can overcome the disadvantages of its high consumption operation and low performance in enqueuing and dequeuing executed by the CPU. Further, it not only can take advantages of the high execution efficiency of the switching chip, but also can overcome the disadvantage of its poor flexibility. Thus, by combining the advantages of the processor and the switching chip, it can improve the performance while guaranteeing the flexibility of the QoS policy, and can effectively improve the execution efficiency of the QoS policy. Moreover, the processor is only responsible for identifying packet property but not performing specific policy actions, and does not involve high consumption operations of enqueuing and dequeuing the packet, which can effectively alleviate the pressure on the processor of the network device.

Regarding the apparatus in the above embodiment, the specific manner in which each unit\module performs an operation has been described in detail in the embodiment of the related method, which will not be repeated herein.

For details about the implementation process of the functions and effects of the units in the above apparatus, reference can be made to the implementation process of the corresponding steps in the above method, details of which will not be repeated herein.

As for the apparatus embodiment, since it basically corresponds to the method embodiment, the relevant part may refer to the description of the method embodiment. The apparatus embodiments described above are only schematic, and the units described as separate components may or may not be physically separated, and the components displayed as units may or may not be physical units, that is, may be located at one place, or can be distributed across multiple network elements. Some or all of these modules can be selected according to actual needs to achieve the objective of the solution of the present disclosure. Those of ordinary skill in the art can understand and implement without creative efforts.

Thus, the description of the structure of the apparatus shown in FIG. 6 is completed.

Figure 7:
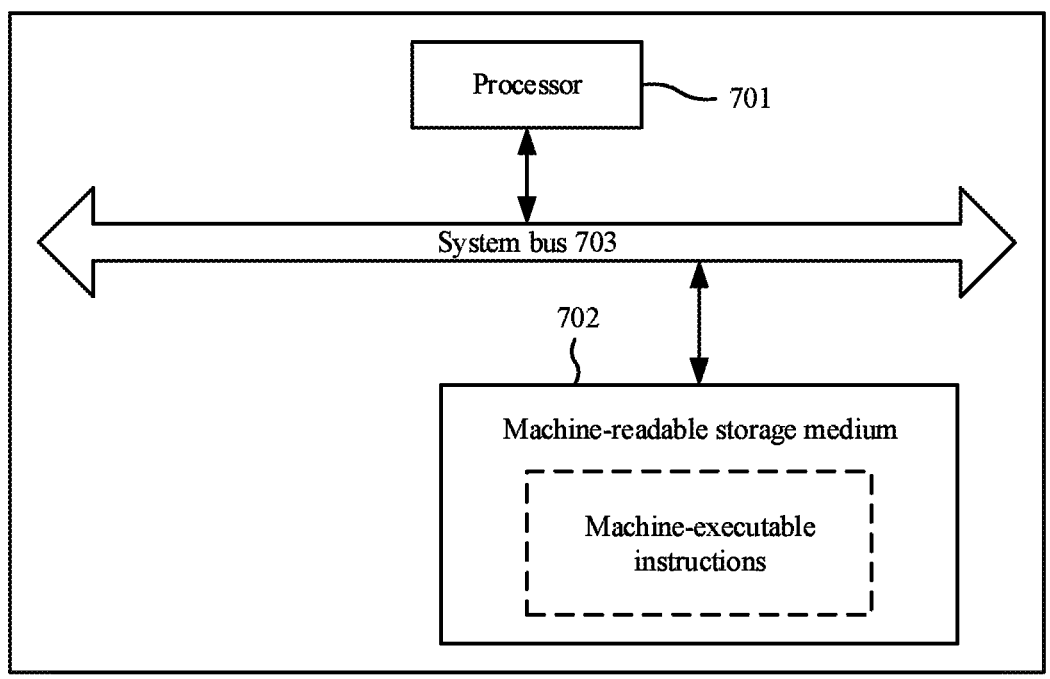
FIG. 7 is a schematic diagram of a network device for executing a QoS policy shown in the present disclosure.

Correspondingly, the present disclosure further provides a schematic diagram illustrating a structure of a network device of the apparatus shown in FIG. 6. As shown in FIG. 7, the network structure may include a switching chip (as shown in FIG. 2), a processor 701 and a machine-readable storage medium 702 storing machine-executable instructions. The processor 701 may communicate with the machine-readable storage medium 702 via a system bus 703. Moreover, by reading and executing the machine-executable instructions in the machine-readable storage medium 702, the processor 701 may be caused to execute the above method of executing a QoS policy.

The machine-readable storage medium 702 mentioned herein may be any of electronic, magnetic, optical, or other physical storage devices and may contain or store information such as executable instructions, data, etc. For example, the machine-readable storage medium may be a volatile memory, a non-volatile memory, or a similar storage medium. Specifically, the machine-readable storage medium may be: a Radom Access Memory (RAM), a flash memory, a storage drive (e.g. a hard disk drive), a solid-state hard disk, any type of storage disks (e.g., an optical disk, a Digital Video Disk (DVD)), or a combination thereof.

The above is only specific embodiments of the present disclosure, and is not limited thereto, and any modifications, equivalent replacement or improvement, etc., within the technical scope of the present disclosure should be covered by the protection scope of the present disclosure.

The invention claimed is:

1. A method of executing a QoS policy, the method applicable to a network device comprising a CPU and a switching chip, the method comprises:
in response to that a packet entering the network device goes through a slow forwarding process, determining, by the CPU, whether the packet matches a flow template according to a property of the packet;
if the packet matches the flow template,
acquiring, by the CPU, a session structure of a network session corresponding to the packet;
adding, by the CPU, a QoS dedicated structure to a tail of the session structure;
acquiring, by the CPU, a QoS policy corresponding to the flow template;
compiling, by the CPU, the QoS policy to obtain policy information;
filling, by the CPU, the policy information to the QoS dedicated structure; and
adding, by the CPU, the policy information in the QoS dedicated structure to the packet; and
after the packet goes through the slow forwarding process, executing, by the switching chip of the network device, the QoS policy,
wherein
the policy information of the QoS policy comprises: information of a designated queue which the packet is to be mapped;
the filling, by the CPU, of the policy information to the QoS dedicated structure comprises:
acquiring, by the CPU, information of the designated queue from the policy information, and
setting, by the CPU, information of a mapping queue field in the QoS dedicated structure according to the information of the designated queue;
the adding, by the CPU, of the policy information in the QoS dedicated structure to the packet comprises:
acquiring, by the CPU, the information of the mapping queue field in the QoS dedicated structure, and
filling, by the CPU, the information of the mapping queue field into a hash header of the packet; and
the executing, by the switching chip of the network device, of the QoS policy comprises:
stripping, by the switching chip of the network device, the hash header at an outbound interface of the switching chip, and
executing, by the switching chip of the network device, a policy action corresponding to the QoS policy according to the information of the mapping queue field of the hash header.

2. The method according to claim 1, wherein before determining, by the CPU, whether the packet matches the preset flow template according to the property of the packet, the method further comprises:
detecting, by the CPU, whether a network session based on the packet has been established; and
if the network session has been established, allowing, by the CPU, to determine whether the packet matches the flow template according to the property of the packet.

3. The method according to claim 1, further comprises:
configuring the QoS flow template in advance.

4. The method according to claim 1, further comprises:
configuring the QoS policy in advance, and
delivering a policy action corresponding to the QoS policy to the switching chip.

5. A network device for executing a QoS policy, the network device comprises:
a switching chip;
a processor coupled to the switching chip; and
a machine-readable storage medium coupled to the processor and storing machine-executable instructions thereon;
when the machine-executable instructions are executed by the processor, the processor is configured to:
in response to that a packet entering the network device goes through a slow forwarding process, determine whether the packet matches a flow template according to a property of the packet;
if the packet matches the flow template,
acquire a session structure of a network session corresponding to the packet;
add a QoS dedicated structure to a tail of the session structure;
acquire a QoS policy corresponding to the flow template;
compile the QoS policy to obtain policy information;
fill the policy information to the QoS dedicated structure; and
add the policy information in the QoS dedicated structure to the packet; and
after the packet goes through the slow forwarding process, the switching chip executes the QoS policy,
wherein
the policy information of the QoS policy comprises:
information of a designated queue which the packet is to be mapped;

the filling of the policy information to the QoS dedicated structure comprises:
   acquiring information of the designated queue from the policy information, and
   setting information of a mapping queue field in the QoS dedicated structure according to the information of the designated queue;

the adding of the policy information in the QoS dedicated structure to the packet comprises:
   acquiring the information of the mapping queue field in the QoS dedicated structure, and
   filling the information of the mapping queue field into a hash header of the packet; and when executing the QoS policy, the switching chip is further configured to:
   strip the hash header at an outbound interface of the switching chip, and
   execute a policy action corresponding to the QoS policy according to the information of the mapping queue field of the hash header.

6. The device according to claim 5, wherein the processor is further configured to:
   detect whether a network session based on the packet has been established; and
   if the network session has been established, allow to determine whether the packet matches the flow template according to the property of the packet.

7. The device according to claim 5, wherein the processor is further configured to:
   configure the QoS flow template in advance.

8. The device according to claim 5, wherein the processor is further configured to:
   configure the QoS policy in advance, and
   deliver a policy action to the switching chip.

* * * * *